Oct. 29, 1957  R. M. ENGELBERT  2,810,964
DEVICE FOR DETERMINING THE POSITIONS OF
THE ILII IN RELATION TO EACH OTHER
Filed July 12, 1955  2 Sheets-Sheet 1
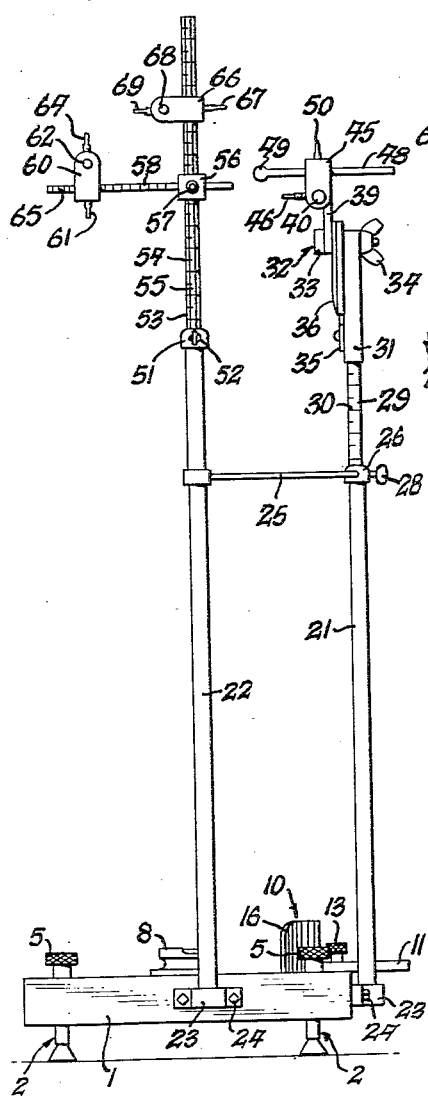
Fig. 2.
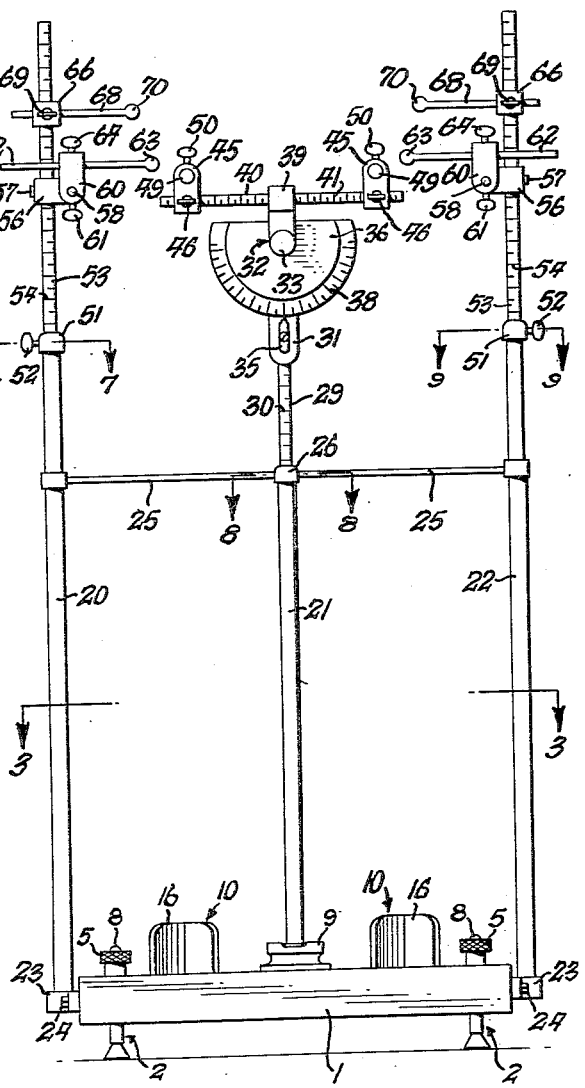
Fig. 1.
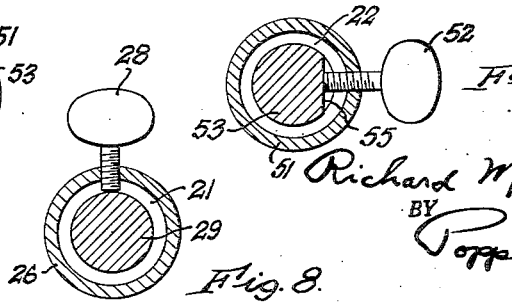
INVENTOR.
Richard M. Engelbert
BY
Popp and Sommer
ATTORNEYS.

Oct. 29, 1957   R. M. ENGELBERT   2,810,964
DEVICE FOR DETERMINING THE POSITIONS OF
THE ILII IN RELATION TO EACH OTHER
Filed July 12, 1955   2 Sheets-Sheet 2
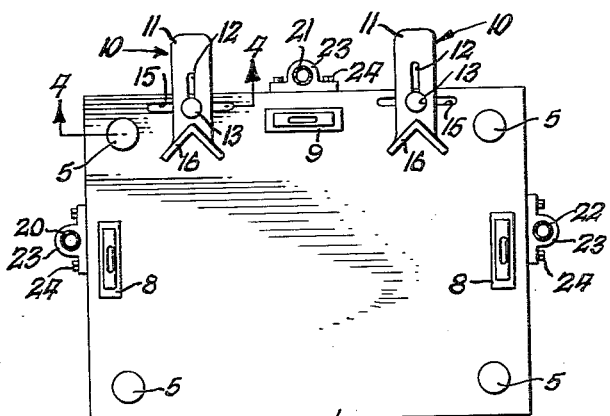
Fig. 3.
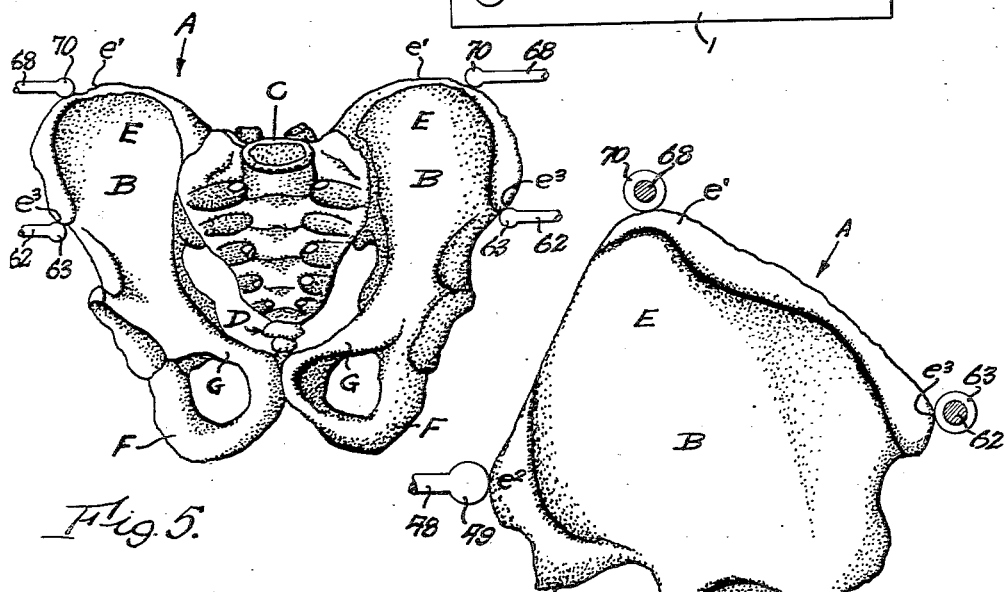
Fig. 5.   Fig. 6.
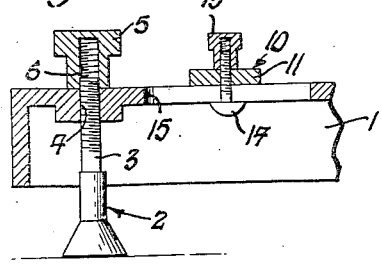
Fig. 4.
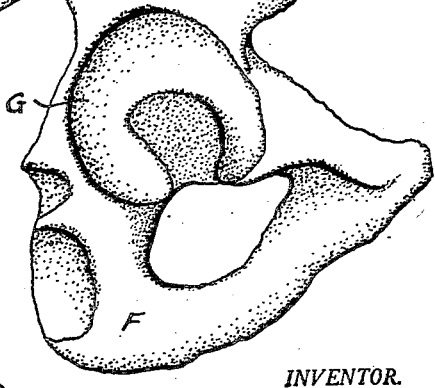
INVENTOR.
Richard M Engelbert
BY
Popp and Sommer
ATTORNEYS

United States Patent Office 2,810,964
Patented Oct. 29, 1957

2,810,964

DEVICE FOR DETERMINING THE POSITIONS OF THE ILII IN RELATION TO EACH OTHER

Richard M. Engelbert, Buffalo, N. Y.

Application July 12, 1955, Serial No. 521,469

4 Claims. (Cl. 33—174)

This invention relates to a device for determining the positions of the ilii with reference to each other for use in the correction of posture and determining the degree of sacrum displacement with reference to the ilii and whether or not the sacrum is out of vertical alinement.

To illustrate the use and purpose of the present invention, in Figs. 5 and 6 is illustrated the pelvic structure A of the human skeleton, this being a generic designation for a group of bones which comprise the right and left innominate bones B, the sacrum C which is intermediate the innominate bones B and the coccyx D which is attached to and projects downwardly from the sacrum. The innominate bones B are each composed of three bones, the ilium E, ischium F and pubis G, consolidated into one in the adult of which the ilium E is the uppermost. The ilium E or upper part of each innominate bone B has a crest $e^1$, a posterior superior spine $e^2$ and anterior superior spine $e^3$. The sacrum C supports the spine (not shown) and each innominate bone B is supported by a femur (also not shown).

Every distortion of the spine (not shown) reflects in a distortion of this pelvic structure A. Such distortions of the spine can be the result of many anatomical disrelations caused principally by (1) faulty postural habits, (2) trauma or injury of some sort, and (3) congenital deformities.

Such distortion of the pelvic structure can result in anterior, posterior or lateral displacement of the sacrum C from the norm. Such displacements result in the sacrum being displaced at an angle to its normal vertical position or result in anterior, posterior or lateral displacement of the ilii and resulting anterior, posterior or lateral displacement of the femur or upper leg bone.

It is the principal object of the present invention to provide a device for determining the positions of the ilii of the pelvic structure in relation to each other and permits measurements to be taken of the degree of superior or inferior displacement of the ilii posteriorly or anteriorly with reference to each other and with reference to the horizontal and vertical.

It is another object of the present invention to provide such a device which is in the form of a simple platform upon which the patient stands and which includes a group of postural columns carrying adjustable and calibrated devices which are brought against different protrusions or spines and crests of the ilii so that the character and degree of any displacement from the norm can be determined from a simple reading of the calibrated devices.

Another object of the invention is to provide such a device which insures that the readings are related to the horizontal and vertical, this being effected by providing adjustable feet and a bubble level on the base so as to insure that the patient stands on a level surface while body engaging devices are being adjusted.

Another object of the invention is to provide a device which is adjustable for persons of different sizes, the platform being provided, for this purpose, with adjustable feet locating devices and the corners also being vertically adjustable.

Another object of the invention is to provide such a device which is highly accurate and from which a record can readily be made so that by succession of measurements at spaced time intervals, a record can be made of improvements in the degree or direction of distortion of the pelvic structure thereby to indicate the degree of effectiveness of the remedial measures being prescribed.

Another object is to provide such a device which is simple to operate and understand and from which the readings can be directly taken so that the degree and direction of distortion of the pelvic structure can be determined and recorded in a very short space of time.

Another object is to provide such a device which can be readily taken apart for transporting the same.

Another object is to provide such a device which is low in cost.

Other objects and advantages of the invention will be apparent from the following description and drawings in which:

Fig. 1 is a front elevational view of a device embodying the present invention for determining the positions of the ilii of a standing patient with reference to each other.

Fig. 2 is a side elevational view thereof.

Fig. 3 is a horizontal section taken generally on line 3—3, Fig. 1, and looking downwardly.

Fig. 4 is an enlarged vertical section taken generally on line 4—4, Fig. 3, and showing the construction of one of the adjustable feet.

Fig. 5 is a front elevational view of the pelvic structure of a human skeleton and showing the manner in which certain of the adjustable prods of the device embodying the present invention can be brought against certain protrusions of the ilii.

Fig. 6 is a side elevational view, on an enlarged scale, viewed from the right hand side of a human skeleton, of the pelvic structure shown in Fig. 4 and again showing certain prods of the device forming the subject of the present invention in contact with certain protrusions of the ilii.

Figs. 7, 8 and 9 are enlarged fragmentary horizontal sections taken on the correspondingly numbered lines on Fig. 1.

The device embodying the present invention includes a rectangular base or platform 1 preferably made of metal having a flat top on which the patient stands, this platform having four screw feet 2. These screw feet are arranged at the four corners of the rectangular support or platform 1 and can be of any suitable construction to permit of leveling the platform. These screw feet are shown in Fig. 4 as each having a threaded vertical shank 3 screwing into a vertical threaded bore 4 through the corresponding corner of the platform 1 so that by manually turning any of the feet 2, its elevation with reference to the platform 1 can be adjusted and thereby permit the platform to be leveled regardless of any slope or irregularity in the floor upon which the device is placed. The end of the threaded shank 3 which protrudes above it can be covered by a screw cap 5, the internal threaded bore 6 of which is of sufficient extent to accommodate the different positions of adjustment of the screw foot 2.

An important feature of the device forming the subject of the present invention is that the upper flat surface of the base 1 be horizontal. This base is used as a platform by the patient under observation and if this platform were not horizontal, his pelvic structure would be thrown out of normal position as a function of his standing on a non-level surface, his one leg being, in effect, longer than his other leg. To this end, a pair of bubble levels 8 are mounted at each side of the platform with their bubbles traveling fore-and-aft so as to determine whether the platform 1 is level in a fore-and-aft direction. In addition, the platform 1 is provided with a rear level 9, the bubble of which travels transversely of the base 1 so as to determine whether the base is level in a transverse direction. By these bubble levels, the platform 1 can be leveled, by adjustment of the screw feet 2, in all directions. It will be understood that a single bubble level of the slightly dome-shaped glass type could be used in lieu of the three bubble levels 8 and 9 shown but for ease in reading and making the adjustments of the screw feet 2, it is preferred that the three bubble levels shown be employed.

The patient stands with his feet upon the platform 1, either in his stocking feet or with corrective shoes, for the purpose of making a measurement of the displacement of the pelvic structure under either condition. In either event, the heels of the patient are brought against adjustable heel pieces indicated generally at 10. These heel pieces are each shown as comprising an elongated plate 11 which can project over the rear edge of the platform 1 and which is provided with a fore-and-aft slot 12. A clamping bolt 14 having an upper tightening nut 13 extends through this slot and also through a transverse slot 15 in the top of the platform 1 near each rear corner thereof. Each plate 11 is formed to provide a forwardly facing upright socket 16 at its forward end, the patient placing each of his heels in a corresponding socket. For adults, the nuts 13 of the clamping bolts 14 would be loosened, and the heel pieces would be adjusted forwardly and also outwardly so as to place the patient further forward on the platform and with his legs having the normal spread of an adult. With a child, the nuts 13 of the foot pieces would be adjusted rearwardly and closer together to position the child further back on the platform 1 and to accommodate the smaller normal spacing of his legs.

Three tubular columns 20, 21 and 22 rise from the support or platform 1. Preferably, each of these columns is secured in a side bracket 23 and which can be secured by bolts or screws 24 to the corresponding side of the platform 1. The column 20 rises from the side of the platform 1 at the right hand side of the patient; the column 21 rises centrally from the rear of the platform 1 and the column 22 rises from the side of the platform 1 at the left hand side of the patient. Each of these three columns 20, 21 and 22 may have cross bars 25 which connect the upper parts of these columns and which curve to permit the patient to stand among the columns without interference from these cross bars. The side columns 20 and 22 are higher than the rear column 21 and the cross bars 25 connect with the top cap 26 of the rear column 21 and which carries a thumb screw 28 engageable with a vertically adjustable telescoping rod 29. This rod 29 telescopes vertically into and out of its column 21 and it can be set at any adjusted height by the thumb screw 28. Preferably, this rod 29 is calibrated in inches, as indicated at 30, in order to permit the recording of the number of inches the posterior superior spine is from the platform and the degree of sacral distortion from the plumb line or center of balance of the patient.

To the upper end of the telescoping rod 29 is fixed a vertical head 31 through the upper end of which a horizontal clamping pivot bolt 32 extends in a fore-and-aft direction. The head 33 of this pivot bolt is arranged in front and a wing nut 34 of this pivot bolt engages the rear face of the head 31. To the lower end of the head 31 is suitably secured a pointer 35 which points upwardly toward the edge of a semicircular metal segment or prod carrying member 36 which is pivotally mounted at its center on the horizontal pivot bolt 32. The margin of this semicircular segment 36 is calibrated on its front face, as indicated at 38, to show, with reference to the pointer 35, the angular position of the segment 36 about the pivot bolt 32. This segment is provided with an upwardly extending arm 39 which centrally supports a fixed normally generally horizontal cross rod 40 projecting transversely of the device.

This horizontal cross rod 40 is graduated in inches, as indicated at 41, and by reason of its mounting is always in a transverse plane generally perpendicular to the axis of the pivot bolt 32 but is capable of moving to different angular positions about this axis.

A prod holder 45 is slidably mounted on each end of the cross rod 40. Each of these prod holders has a bore through which the cross bar 40 slidingly extends and the prod holder can be held at any set position along the cross rod 40 by a thumb screw 46. The prod holder also has another generally horizontal bore extending fore-and-aft or generally parallel with the axis of the pivot bolt 32 and in which bore a prod 48 is slidingly fitted. These prods move fore-and-aft and at their forward ends are each provided with a knob 49 which is brought against the posterior superior spine of the corresponding ilium in using the device. Each of these prods 48 can be fixed with reference to its prod holder 45 by a thumb screw 50.

Each side column 20 and 22 is provided with a top cap 51 which carries a thumb screw 52 engageable with a vertically adjustable telescoping rod 53. This telescoping rod 53 telescopes vertically into and out of its column 20 or 22 and it can be set at any adjusted height by the thumb screw 52. Preferably, each telescoping rod 53 is calibrated in inches, as indicated at 54 in order to permit of determining the degree of displacement of the pelvic structure as hereinafter described. Each telescoping rod 53 is provided at one side with a flat 55 which the thumb screw 52 engages as best shown in Figs. 2, 7 and 9. The purpose of the flats 55 is to insure that the rods 53 move vertically without turning about their axes so that the prods carried by these rods are always correctly oriented.

Each vertical rod 53 carries a vertically adjustable slide block 56 having a vertical bore which slidingly fits the telescoping rod 53 and which can be held in any adjusted vertical position by a set screw 57. Each of these slide blocks 56 carries a generally horizontal bar 58 which projects horizontally forwardly from its slide block 56, these bars 58 being arranged parallel with each other perpendicular to the cross rod 40 and parallel with the axis of the pivot 32. At its forward end, each bar 58 carries a prod holder 60 which can be identical with the prod holder 45 in being slidingly mounted on the corresponding horizontal bar 58 and held in any set position by a thumb screw 61. As with the prod holder 45, the prod holder 60 slidingly supports a horizontal prod 62 which extends perpendicular to the bar 58 and hence parallel with the cross rod 40. This prod has a knob 63 at its inner end, these knobs being intended to be brought against the anterior superior spine $e^3$ of the ilium in determining the degree of displacement of the pelvic structure as hereinafter described. Each prod 62 is movable longitudinally and is held in its adjusted longitudinal position by a thumb screw 64. Also an important feature of the invention resides in each bar 58 being calibrated, as indicated at 65, so that the forward position of each prod 62 is indicated by a scale.

Each vertical telescoping rod 53 also carries another prod holder 66 at its upper end, this prod holder being similar to the prod holders 45 and 60 and being slidable vertically along the telescoping rod 53 and held at any fixed position by a thumb screw 67. This prod holder carries a horizontal prod 68 which is slidingly mounted in this prod holder and held in any fixed position by a thumb screw 69. This prod extends transversely of the device and hence parallel with the cross rod 40, and at its inner end is provided with a knob 70 which is adapted to be brought against the crest $e^1$ of the corresponding ilium.

In the operation of the apparatus forming the subject of the present invention, the platform 1 is first leveled. This is done by loosening the screw caps 5 and turning each of the four screw feet 2 until the bubbles of all three bubble levels 8 and 9 are centered. After the platform has been so leveled, the screw caps 5 are screwed down to hold the feet 2 in this position.

The heel pieces 10 are then adjusted, this being done by loosening the clamping bolts 13. The essential purpose of adjusting the heel plates is to aline the patient between the side posts 20, 22 so that when the prods 68 are moved longitudinally their knobs are brought against the crests of the patient's ilium. For adults, the heel pieces 10 are spread apart and moved forwardly. For children, the heel pieces are brought together and moved rearwardly. This movement of the heel pieces 10 is permitted by the slots 12 and 15 in the heel piece and platform respectively and which are disposed at right angles to each other. After the heel pieces 10 have been adjusted, the clamping bolts 13 are tightened to hold this adjustment.

At each side of the apparatus the thumb screws 52 are then loosened. This permits each vertical telescoping rod 53 to be raised or lowered but the flat 55 on this rod prevents it from turning in its column 20 or 22. This flat also holds the prod holders 56 and 66 to maintain the prods 62 and 68 parallel with the cross rod 40.

Each rod 53 is then raised until its prod 68 is brought into horizontal alinement with the crest $e^1$ of the ilium of the patient. To facilitate this, the thumb screw 69 can be loosened and the prod 68 can be moved lengthwise against this crest $e^1$ of the ilium of the patient. The thumb screws 66 and 69 are then tightened so as to hold the prod 68 in this position.

The operator then loosens each set screw 57 and raises or lowers the corresponding slide block 56 until the prod 62 carried by this slide block is brought generally into horizontal alinement with the anterior superior spine $e^3$ at the corresponding side of the patient. He then tightens this set screw 57 and loosens the thumb screws 61 and 64. The operator then moves the slide block 60 along the bar 58 and moves the prod 62 along this slide block 60 until the knob 63 of this prod is brought against the anterior superior spine $e^3$ at the corresponding side of the patient. He then tightens the thumb screws 64 and 61 so as to hold the parts in this relation.

The thumb screw 28 is then loosened and the central telescoping rod 29 raised so as to bring the knobs 49 of the prods 48 up to the level of the posterior superior spines of the patient's pelvic structure. If these spines are at different elevations these prods are brought to a position intermediate these elevations. The thumb screw 28 is then tightened.

The knobs 49 of the prods 48 are then brought against the posterior superior spines of the patient's pelvic structure. This is accomplished by loosening the thumb screws 46 and 50 as well as the wing nut 34. Loosening the thumb screws 46 permits the prod holders 45 carrying the prods 48 to move longitudinally of the cross rod 40. These prod holders 45 are moved out to be in fore-and-aft alinement with the patient's posterior superior spines; the cross rod 40 is tilted about the axis of the clamping pivot bolt 32 until these prods are in alinement with the respective posterior superior spines of the patient; and the prods 48 are moved forwardly against these posterior superior spines so that the proper position of the parts can be accurately effected by actual pressure of the prods 48 against the posterior superior spines of the patient's pelvic structure. When this is done, the wing nut 34 and thumb screws 46 and 50 are tightened.

This completes the measurements and the patient can step down from the platform 1 and the operator can observe and make such record as he deems necessary of the degree of displacement of the pelvic structure from normal. The significant measurements of such distortion are as follows:

The reading on the semicircular scale 38, as indicated by the pointer 35, is of important significance in that it shows whether or not the posterior superior spine $e^2$ at one side of the patient is at the same elevation as the posterior superior spine at the opposite side of the patient. If a material difference in elevation of the patient's posterior superior spines $e^2$ exists, the apparatus demonstrates not only that the entire pelvic structure lists to one side but also the degree of such list so that measures, such as corrective footwear, can be prescribed for correcting this list.

The readings of the scale 41 on opposite sides of the central arm 39, as determined by the slide blocks 45, is also a significant measurement since while the segmental scale 38 will show the degree of list of the pelvic structure as determined by the relative elevations of the posterior superior spines $e^2$ of the patient, this circular scale does not show the degree to which the entire pelvic structure has been offset to the left or to the right by reason of such distortion. Such departure of the posterior superior spines from normal centered relation is shown by the relative readings of the scale 41 at opposite ends of the rod 40. The readings on the rod 40 accordingly indicate how much the entire pelvic structure is out of plumb with reference to the norm.

The significant measurements of the prods 62 and 68 are along the scales 54 and 65 on the rods 53 and bars 58, respectively. The reading on each scale 54 is the vertical distance between the slide blocks 56 and 66 which is a reading of the difference in the elevation between the prods 62 and 68 and hence the relative elevation of the crest $e^1$ and anterior superior spine $e^3$ at the corresponding side of the patient. The reading on each scale 65 along the bar 58 is between the corresponding slide blocks 56 and 60 and this reading indicates the horizontal distance of the crest $e^1$ of the ilium and the anterior superior spine $e^3$ at the corresponding side of the patient. With both vertical and horizontal measurements of the patient's anterior superior spine $e^3$ with reference to the crest $e^1$ of the ilium at each side, the degree of forward or rearward pitch of the entire pelvic structure from the norm can be determined as well as any twist of the pelvic structure about a vertical axis which would be shown by a greater reading on the horizontal scale 65 at one side of the device in relation to the reading on the same scale 65 on the other side of the device.

From the foregoing, it will be seen that the present invention provides a very simple and easily manipulated device for determining both the character and degree of distortion of the pelvic structure in all directions in such manner that a record can be made, this being important not merely in determining what corrective measures should be taken but also in determining how effective the corrective measures are and what changes should be made in the corrective measures, this being done, of course, by taking a periodical series of measurements during the period of treatment.

I claim:

1. A measuring device for determining relative positions of parts of the human anatomy comprising a platform for supporting a person in standing position, a pair of members on the platform for designating the position of the feet of a subject person, a central column carried by the platform between said members, means for adjusting the position of said members on the platform relative to each other and to said column, a right column and a left column carried by the platform at the outer sides of said pair of members, a rod supported for vertical movement on each of said columns, prods carried by said rods on the side thereof adjacent the space within the columns where a human body is placed for measurement, means for releasably holding said prods in different positions on said rods, means for holding said rods in different positions on said columns, means for designating different positions of the prods on the rods and of the rods on the columns, a horizontal bar, a pair of said prods being carried on said bar, means rockably supporting the bar on the rod of the central column about an axis substantially perpendicular to the vertical plane passing through said pair of members, means for releasably holding the bar in different angular positions relative to the rod, and means designating different angular positions of the bar on the rod.

2. A measuring device as defined by claim 1 and means for leveling the plane of the platform and for indicating a true horizontal position thereof.

3. A measuring device as defined by claim 1, a horizontal bar for supporting a prod on each of the rods of the right and left columns, said prods being slidable on said bars, and means for releasably holding the prods in different positions on said bars.

4. A measuring device as defined by claim 3, pivoted means between the prods and bars for moving the prods angularly relative to the bars, and means for releasably holding the prods in different angular positions on each bar.

References Cited in the file of this patent

UNITED STATES PATENTS

| | | |
|---|---|---|
| 889,224 | Haas | June 2, 1908 |
| 1,209,345 | Smith | Dec. 19, 1916 |
| 2,029,067 | Graham | Jan. 28, 1936 |
| 2,053,810 | Bisel | Sept. 8, 1936 |
| 2,063,922 | Greenberg | Dec. 15, 1936 |
| 2,081,133 | Bisel | May 25, 1937 |
| 2,349,664 | Leighty | May 23, 1944 |

FOREIGN PATENTS

| | | |
|---|---|---|
| 45,502 | Austria | Jan. 10, 1911 |
| 742,944 | Germany | Dec. 15, 1943 |
| 1,043,979 | France | Nov. 13, 1953 |
| 905,125 | Germany | Feb. 25, 1954 |